United States Patent [19]

Fillingim

[11] 3,861,204

[45] Jan. 21, 1975

[54] DYNAMOMETER TESTING RIG

[75] Inventor: Leland T. Fillingim, Lubbock, Tex.

[73] Assignee: Northern Propane Gas Company, Omaha, Nebr.

[22] Filed: Sept. 23, 1970

[21] Appl. No.: 74,586

[52] U.S. Cl. .................................. 73/117, 74/14
[51] Int. Cl. .............................................. G01l 5/13
[58] Field of Search .......................... 73/117; 74/14

[56] References Cited
UNITED STATES PATENTS

| | | | |
|---|---|---|---|
| 2,502,914 | 4/1950 | Aspegren | 74/14 |
| 2,716,339 | 8/1955 | Cline | 73/117 |
| 3,345,865 | 10/1967 | Ostrander | 73/117 |
| 3,411,346 | 11/1968 | Gagliardi | 73/117 |
| 3,455,153 | 7/1969 | Levine et al. | 73/117 |

Primary Examiner—Jerry W. Myracle
Attorney, Agent, or Firm—Merriam, Marshall, Shapiro & Klose

[57] ABSTRACT

A vehicle testing rig for use with a portable power take-off dynamometer is disclosed which includes horizontally spaced dual frames, each having paired roll means, and means for transmitting rotational motion imparted to the roll means by vehicle wheels to said portable dynamometer.

8 Claims, 7 Drawing Figures

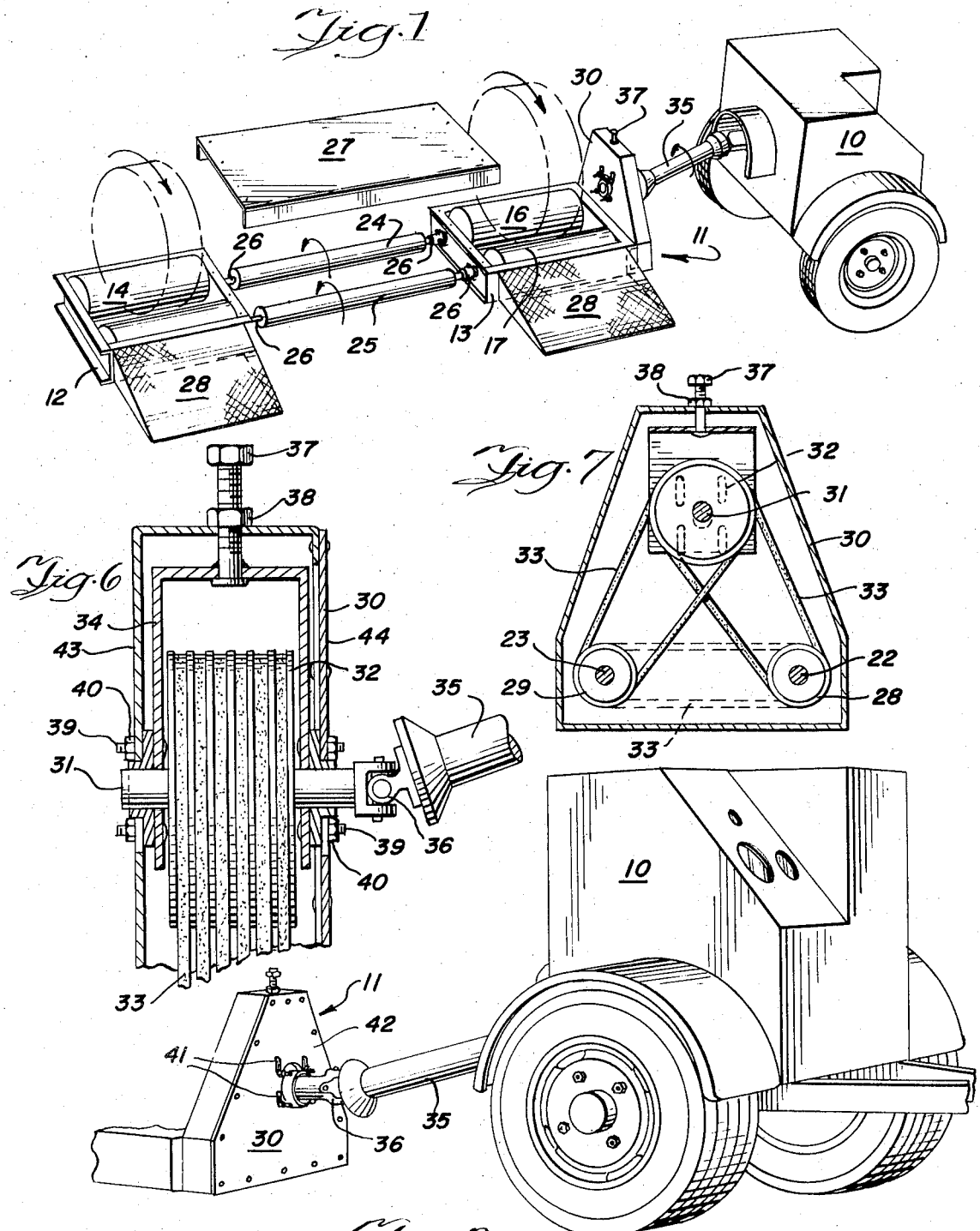

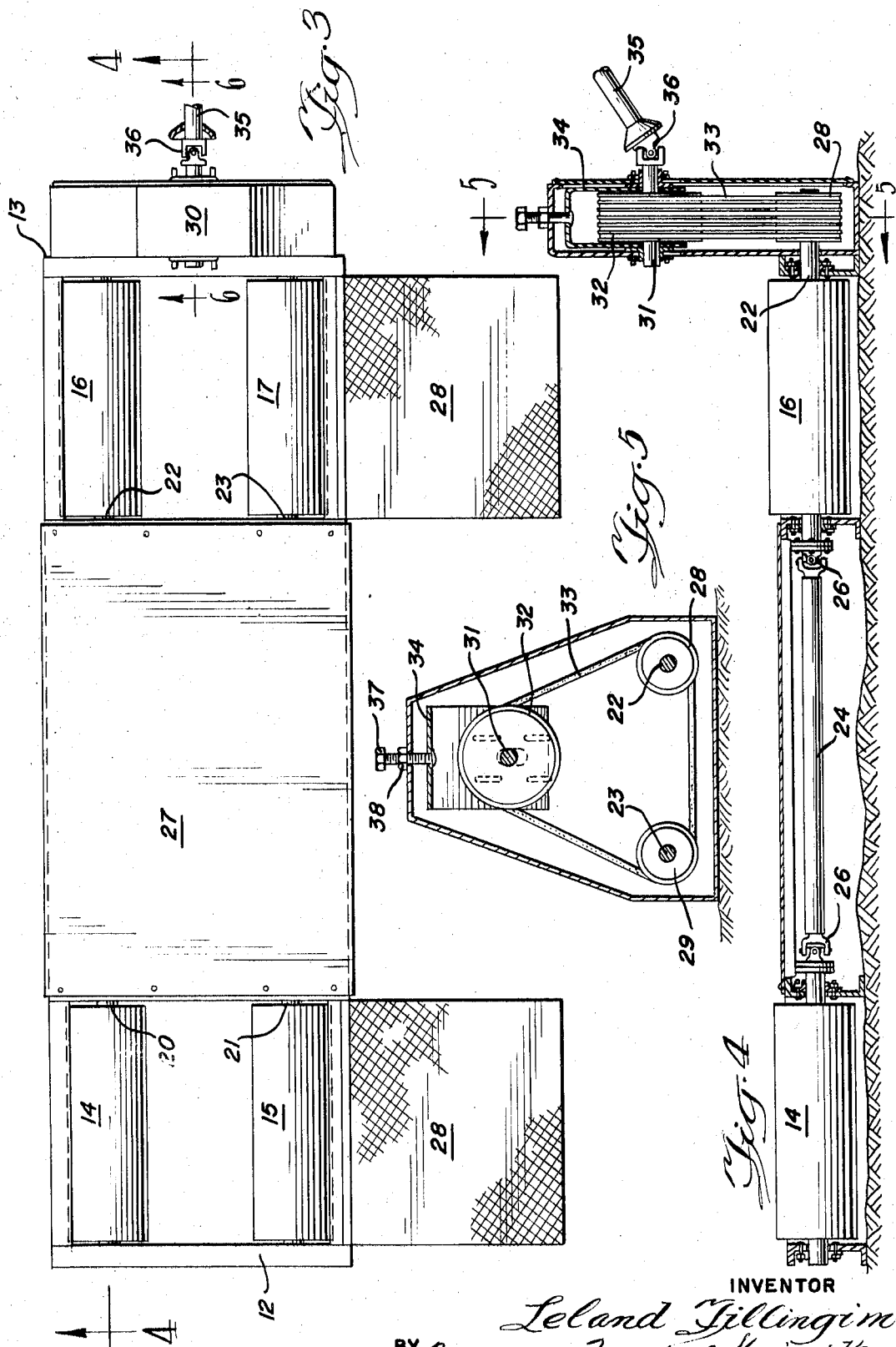

DYNAMOMETER TESTING RIG

BACKGROUND OF THE INVENTION

This invention relates generally to a vehicle testing rig for use with a portable power take-off dynamometer and more particularly to a rig exceptionally suitable for on-site testing of fleets of vehicles in various areas.

The use of power absorbing and measuring devices such as dynamometers for performing periodic and routine engine tests is well known and has widespread application. Testing procedures normally involve simulation of road conditions while the vehicle remains in a fixed position, allowing for instant adjustment in carburator fuel-air ratio, distributor timing and the like. Such simulation of road conditions is accomplished by positioning the drive wheels of the tested vehicle on roll means, usually a pair of large seamless rolls comprising a "drive" roll and an "idler" roll. When the drive wheels of the vehicle are engaged, their rotational motion is frictionally transmitted to the drive roll and the motion of that roll is in turn transmitted to a power absorbing and measuring device.

A standard requirement for the effective use of such apparatus is that the roll means be stably mounted on bearings in a frame and that the frame itself be mounted in a permanent, fixed position at a garage or other specified testing area. Installations of this type are expensive, are not portable, and are thus limited in their effective economical use to more densely populated urban areas where great distances need not be travelled to make use of them. Furthermore, there are inherent limitations on the variety of vehicles which may be tested at such installations due to variations in drive wheel sizes of vehicles. For example, a roller installation suitable for use in testing a passenger auto or small pickup truck could not ordinarily be effectively employed to test a tractor or larger vehicles in the one to four ton weight range.

Various attempts have been made to develop an effective portable apparatus. U.S. Pat. No. 3,491,587, for example, discloses one such portable unit. Such units incorporate complicated hoisting means for deriving portability and further include a heavy, rigid frame for mounting long drive and idler rolls. Heavy frames of this kind are thought to be required to impart stability to the apparatus and to prevent excessive wear on support bearings of the rolls when the apparatus is used, for example, in an adverse rural environment having uneven ground surfaces.

Attempts have also been made to develop dynamometer apparatus which is both portable and suitable for use in performing tests on tractor vehicles and the like. In this respect, portable power take-off dynamometers such as those available under the trade designation, "M & W PTO, P–400B Hydra-Gauge Dynamometer" have been developed.

The developments thus made are seen to be at best an incomplete and compromising solution to the problem of providing effective testing service for all types of vehicles. At least two power absorbing units are necessary if complete service is to be provided: one unit for direct power "take-off" on tractors; and one unit for use on passenger vehicles, pick-up trucks, and other service vehicles.

SUMMARY OF THE INVENTION

Generally stated, the vehicle testing rig of the present invention permits adaptation of a portable power take-off dynamometer (heretofore limited in the scope of its use to tractor-type vehicles) for use in testing of passenger vehicles, pick-up trucks and the like.

The rig of the invention generally comprises a pair of horizontally spaced frames, each having mounted thereon pairs of substantially parallel roll means adapted to receive and cradle the driven wheels of the auto or pick-up truck to be tested. Means are provided for the articulated interconnection of laterally corresponding roll means of the frames and for the transmission of the cumulative rotational motion of all roll means to the power absorbing and measuring portable dynamometer.

A rig so constructed is easily transported in assembled or partially dissassembled states to all locations where the portable dynamometer is taken. Further, such a rig may accommodate vehicles of various drive wheel spans on surfaces which are substantially more uneven than those normally required for other portable devices.

Further advantages of the present invention will become apparent to those skilled in the art through consideration of the following detailed explanation and description of a preferred exemplary embodiment of a vehicle testing rig constructed according to the invention and the accompanying drawings wherein:

FIG. 1 is a perspective view of an embodiment of an assembled testing rig of the present invention;

FIG. 2 is a partial side view of the rig of FIG. 1 showing the attachment of external transmission means to a portable power take-off dynamometer;

FIG. 3 is a top plan view of the embodiment of FIG. 1;

FIG. 4 is a sectional view taken along line 4—4 of FIG. 3;

FIG. 5 is a vertical section along line 5—5 of FIG. 4;

FIG. 6 is an enlarged fragmentary view of the embodiment of the transmission means shown in FIG. 4; and FIG. 7 is an alternate embodiment of the transmission means shown in FIG. 5.

External aspects of a preferred embodiment of the testing rig of the present invention are shown in FIGS. 1, 2 and 3. Referring first to FIGS. 1 and 2, a portable power take-off dynamometer 10 is shown in association with a testing rig 11 constructed according to the invention. First and second rectangular frames 12, 13 of the rig are preferably made of welded heavy gauge steel. Mounted on frames 12, 13 are pairs of substantially parallel roll means 14, 15 and 16, 17 for receiving and cradling the driven wheels 18, 19 (in phantom lines) of a vehicle to be tested.

Roll means 14, 15, 16 and 17 are preferably of seamless mechanical tubing about 36 inches long and about 8¼ inches in diameter. These are mounted on axial shafts 20, 21 22 and 23, preferably having a diameter of about 1½ inches. The shafts are in turn mounted on the frames by means of bearings (not shown). Bearings suitable for use in the invention may be of a variety of types, although block-mounted, self-aligning bearings have been found to be exceptionally suitable.

Shafts 24 and 25 are employed for interconnecting laterally corresponding roll means of frames 12, 13.

Shaft 24, for example, is shown interconnecting shafts 20 and 22 of roll means 14 and 16 respectively, while shaft 25 interconnects shafts 21 and 23 of roll means 15 and 17 respectively. Connection of shafts 24 and 25 to roll means shafts is preferably accomplished by universal joints 26. Further, shafts 24 and 25 are preferably splined.

These latter aspects of the invention may be seen to provide for the effective operation of the rig on uneven ground areas found in many areas inasmuch as they allow operation of the rig even while frames 12 and 13 rest on differing horizontal planes.

Removable center plate 27 may be supported on adjacent edges of frames 12 and 13 in order to protect shafts 24 and 25 from accidental damage by the wheels of the tested vehicle. Appropriate securing means may be provided, if desired, to establish and maintain a fixed horizontal distance between frames. Ramps 28 may be releasably secured by suitable means to frames 12 and 13 in order to facilitate positioning vehicle wheels on the roll means.

In operation, drive wheels of a vehicle to be tested are driven onto roll means 14, 15 and 16, 17. Suitable releasable securing means such as link chains (not shown) are employed to prevent lateral shifting of the vehicle during testing. With the vehicle thus positioned, the drive wheels are engaged and frictionally impart rotational motion to the roll means in the direction indicated by arrows.

The transmission means preferably employed to transmit rotational motion (impacted to the roll means by the driven wheels of the test vehicle) to the portable power take-off dynamometer is shown in FIGS. 4, 5, 6 and 7.

As shown in FIGS. 4 and 5, shafts 22 and 23 of roll means 16, 17 extend into housing 30 adjacent frame 13. Affixed to shafts 22 and 23 are pulley sheaves 28 and 29. Supported by block 34 in housing 30, in aligned position above sheaves 28 and 29, is shaft 31 having pulley sheaves 32. Sheaves 28 and 29 cooperate with sheaves 32 through frictional contact with endless belts 33 so that rotational motion of any or all roll means is transmitted to sheaves 32 and shaft 31. It should be appreciated that while multiple sheaves are provided on each shaft in the illustration and multiple endless belts are therefore employed, a single sheave on each of shafts 22, 23 and 31 may operatively be provided and, correspondingly, a single endless belt may be employed for frictional interconnection of the sheaves. Endless belts 33 are preferably of steel or steel-reinforced composition and appropriate tension is provided through variable adjustment of block 34 within housing 30 as described in greater detail subsequently.

Shaft 31 is interconnected with shaft 35 of portable power take-off dynamometer 10 by universal joint means 36.

An alternative embodiment of the transmission means of FIG. 5 is shown in FIG. 7. In that embodiment, at least three endless belts 33 are employed to coordinate, accumulate and transmit rotational motion of all four roll means to shaft 31. Such an embodiment may, of course, require variation in horizontal positioning and alignment of pulley sheaves on appropriate shafts.

As mentioned earlier, shaft 31 is supported in block 34 within housing 30 on suitable bearings (not shown). Variation in the vertical distance between shaft 31 and shafts 22 and 23 is accomplished by means of bolt 37, stop-lock nut 38 as well as block bolts 39 and nuts 40 which cooperate with slots 41 cut in sides 42, 43 of housing 30. In this manner, maximum frictional contact may be maintained among belts and sheaves and replacement of worn belts may be easily accomplished.

Effective operation of the rig of the present invention is illustrated by the following test reports. In each of the tests a pick-up truck was backed onto the roll means and secured to the frames by crossed, link chains to prevent sway. Dwell meter, timing light, vacuum gauge and exhaust analyzer were then connected. Test measurement data was accumulated and various adjustments were made in a manner well known in the art.

VEHICLE TEST NO. 1

| 2" Vacuum | | |
|---|---|---|
| Gear Speed: | 50 m.p.h. | |
| R.P.M.: | 2700 | |
| Fuel Reading: | Before = 11.4 | After = 13.3 |
| Peak Horsepower | Before = 50 | After = 57 |
| 10" Vacuum | | |
| Gear Speed: | 30 m.p.h. | |
| R.P.M.: | 1700 | |
| Fuel Reading: | Before = 11.5 | After = 13.2 |
| Peak Horsepower: | Before = 36 | After = 47 |
| Distributor Initial Timing: | Before = 9° | After = 9° |
| Centrifugal Advance: | Before = 7° | After = 7° |
| Total: | Before = 23° | After = 23° |

Comment: The pick-up truck tested had too rich a fuel mixture although engine timing aspects were adequate. About a 23 percent increase in horsepower was achieved by correcting the fuel mixture under load conditions.

VEHICLE TEST NO. 2

| 2" Vacuum | | |
|---|---|---|
| Gear Speed: | 60 m.p.h. | |
| R.P.M.: | 3200 | |
| Fuel Reading: | Before = 14.1 | After = 13.0 |
| Peak Horsepower: | Before = 55 | After = 67 |
| 10" Vacuum | | |
| Gear Speed: | 40 m.p.h. | |
| R.P.M.: | 1800 | |
| Fuel Reading: | Before = 14.1 | After = 13.2 |
| Peak Horsepower: | Before = 38 | After = 55 |
| Distributor Initial Timing: | Before = 2° | After = 10° |
| Centrifugal Advance: | Before = 15° | After = 7° |
| Vacuum Advance: | Before = 15° | After = 10° |
| Total: | Before = 49° | After = 34° |

COMMENT: The truck tested had too lean a fuel mixture. Adjustment of fuel mixture, ignition timing, centrifugal and vacuum advance was effected, resulting in about a 33 percent increase in horsepower.

Obviously, many modifications and variations of the above-described invention may be made without departing from the spirit and scope thereof. Therefore,

What is claimed is:

1. In a motor vehicle testing apparatus including first and second horizontally spaced frame means provided respectively with first and second pairs of spaced, substantially parallel roll means, each pair of roll means being adapted to receive, cradle and be rotated by a driven wheel of a motor vehicle to be tested, and means mounting said pairs of roll means in said frames, the improvement comprising a portable vehicle testing rig for use with a portable power take-off dynamometer, said rig comprising:

a pair of connecting shaft means, including universal joint means at the end portions thereof, interconnecting laterally corresponding rolls of said first and second pairs of roll means;

a rotatable power transmitting shaft associated with one of said frame means; and, means for transmitting rotational motion of interconnected rolls of said first and second pairs of roll means to said rotatable shaft, whereby, during vehicle testing, said first and second frame means are vertically displaceable from one another, rotation of driven wheels of said vehicle to be tested imparts rotational motion to each roll of said first and second pairs of roll means, and said rotational motion of said rolls is transmitted to said rotatable power transmitting shaft to impart rotational motion thereto.

2. A testing rig as set forth in claim 1 wherein said connecting shaft means interconnecting laterally corresponding rolls of said first and second pairs of roll means are splined.

3. A testing rig as set forth in claim 1 wherein each roll of said first and second pairs of roll means is affixed to an axial shaft supported by said mounting means of said first and second frame means.

4. A testing rig as set forth in claim 3 wherein said means for transmitting rotational motion of interconnected rolls of said first and second pairs of roll means to said rotatable power transmitting shaft includes at least one pulley sheave affixed to each of the axial shafts of the pair of roll means with which said rotatable power transmitting shaft is associated, at least one pulley sheave on said rotatable power transmitting shaft and endless belt means in frictional contact with all said pulley sheaves.

5. Motor vehicle testing apparatus, said apparatus comprising:

a portable power take-off dynamometer testing means; a testing rig comprising, a. a first frame means including a first pair of spaced, substantially parallel roll means adapted to receive, cradle and be rotated by a driven wheel of a motor vehicle to be tested and means for mounting said first pair of roll means, b. a second frame means, horizontally spaced from said first frame means, including a second pair of spaced, substantially parallel roll means adapted to receive, cradle and be rotated by another driven wheel of said vehicle and means for mounting said second pair of roll means, c. a pair of connecting shaft means, including universal joint means at the ends thereof, interconnecting laterally corresponding rolls of said first and second pairs of roll means, d. a rotatable power transmitting shaft associated with one of said frame means, and, e. means for transmitting rotational motion of interconnected rolls of said first and second pairs of roll means to said rotatable shaft; and means for transmitting rotational motion of said rotatable power transmitting shaft to said portable power take-off dynamometer, whereby, during vehicle testing, said first and second frame means are vertically displaceable from one another, rotation of the driven wheels of said vehicle to be tested imparts rotational motion to each roll of said first and second pairs of roll means, said rotational motion of said rolls is transmitted to said rotatable power transmitting shaft to impart rotational motion thereto, and said rotational motion of said rotatable power transmitting shaft is transmitted to said portable power take-off dynamometer allowing dynamometer testing of said vehicle to be tested.

6. Apparatus as set forth in claim 5 wherein said connecting shaft means interconnecting laterally corresponding rolls of said first and second pairs of roll means are splined.

7. Apparatus as set forth in claim 5 wherein each roll of said first and second pairs of roll means is affixed to an axial shaft supported by said mounting means of said first and second frame means.

8. Apparatus as set forth in claim 7 wherein said means for transmitting rotational motion of interconnected rolls of said first and second pairs of roll means to said rotatable power transmitting shaft includes at least one pulley sheave affixed to each of the axial shafts of the pair of roll means with which said rotatable power transmitting shaft is associated, at least one pulley sheave on said rotatable power transmitting shaft and endless belt means in frictional contact with all said pulley sheaves.

* * * * *